United States Patent [19]

Aquino

[11] Patent Number: 5,142,820
[45] Date of Patent: Sep. 1, 1992

[54] MULTIPLE FLOWER STEM HOLDER

[76] Inventor: Thomas Aquino, 2439 Sycamore Ave., Wantagh, N.Y. 11793

[21] Appl. No.: 626,749
[22] Filed: Dec. 13, 1990
[51] Int. Cl.5 ............................................. A01Q 5/04
[52] U.S. Cl. ................................................. 47/41.12
[58] Field of Search ............... 47/41.01, 41.12, 41.11, 47/64, 41.1, 41.13, 41.14, 41.15

[56] References Cited

U.S. PATENT DOCUMENTS

| 674,116 | 5/1901 | Kift | 47/41.11 |
| 1,826,500 | 11/1930 | Blake | 47/41.11 |
| 1,887,139 | 11/1932 | Richardson | 47/41.11 |
| 2,126,766 | 8/1938 | Gerbermann | 47/41.11 |
| 2,358,295 | 9/1944 | Bacigalupi | 47/41.01 |
| 2,453,906 | 11/1948 | Hamlet | 47/41.11 |
| 2,750,138 | 6/1956 | Morris | 47/41.01 |
| 2,837,855 | 6/1958 | Hoke | 47/41.11 |

FOREIGN PATENT DOCUMENTS 2191692  12/1987  United Kingdom ............... 47/41.11

Primary Examiner—David A. Scherbel
Assistant Examiner—Michele A. Van Patten
Attorney, Agent, or Firm—Michael I. Kroll

[57] ABSTRACT

A multiple lower stem holder is provided and consists of a closure cap which fits over an open top of a receptacle holding water therein. The closure cap has a plurality of apertures to allow flower stems to pass therethrough. A pliable layer covers the closure cap and has a plurality of crossed slots which align with the apertures. When the flower stems are inserted into the crossed slots and through the apertures, the crossed slots will automatically self seal about the flower stems.

8 Claims, 2 Drawing Sheets

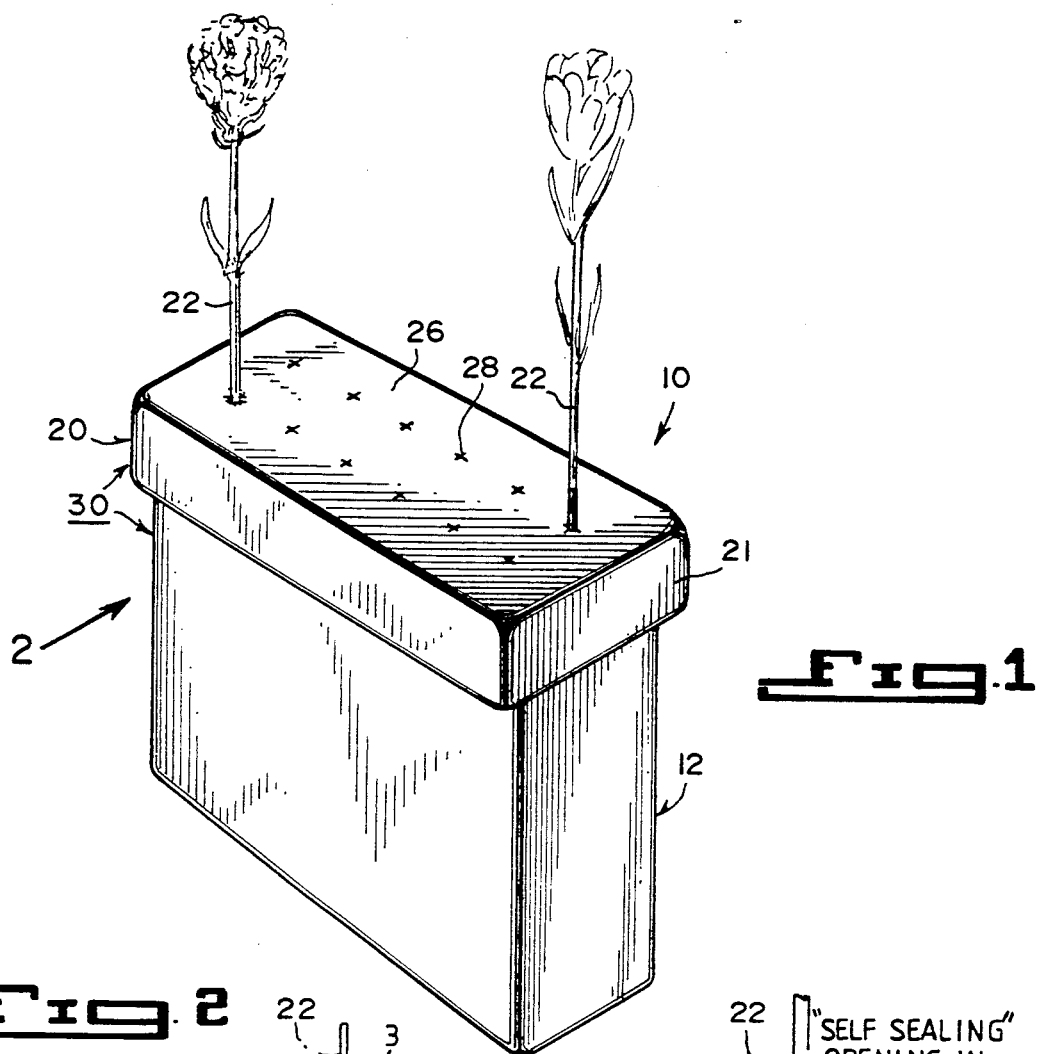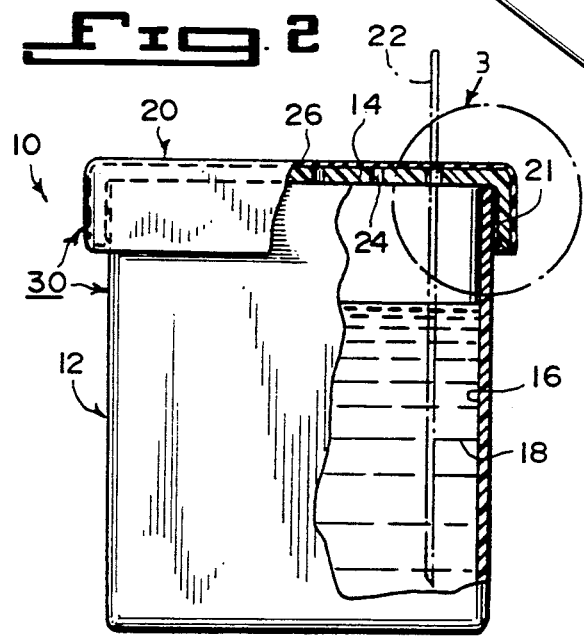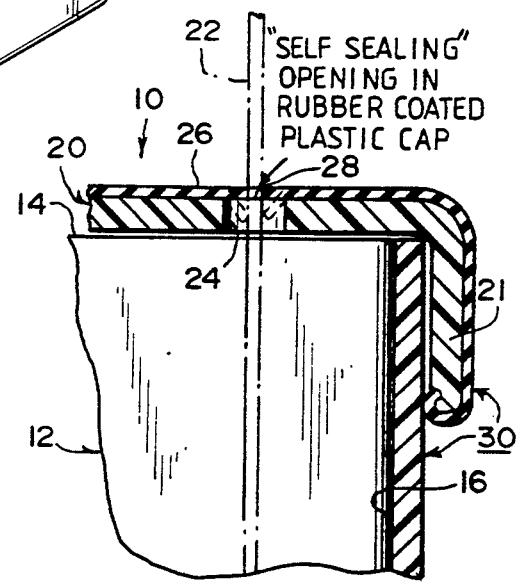

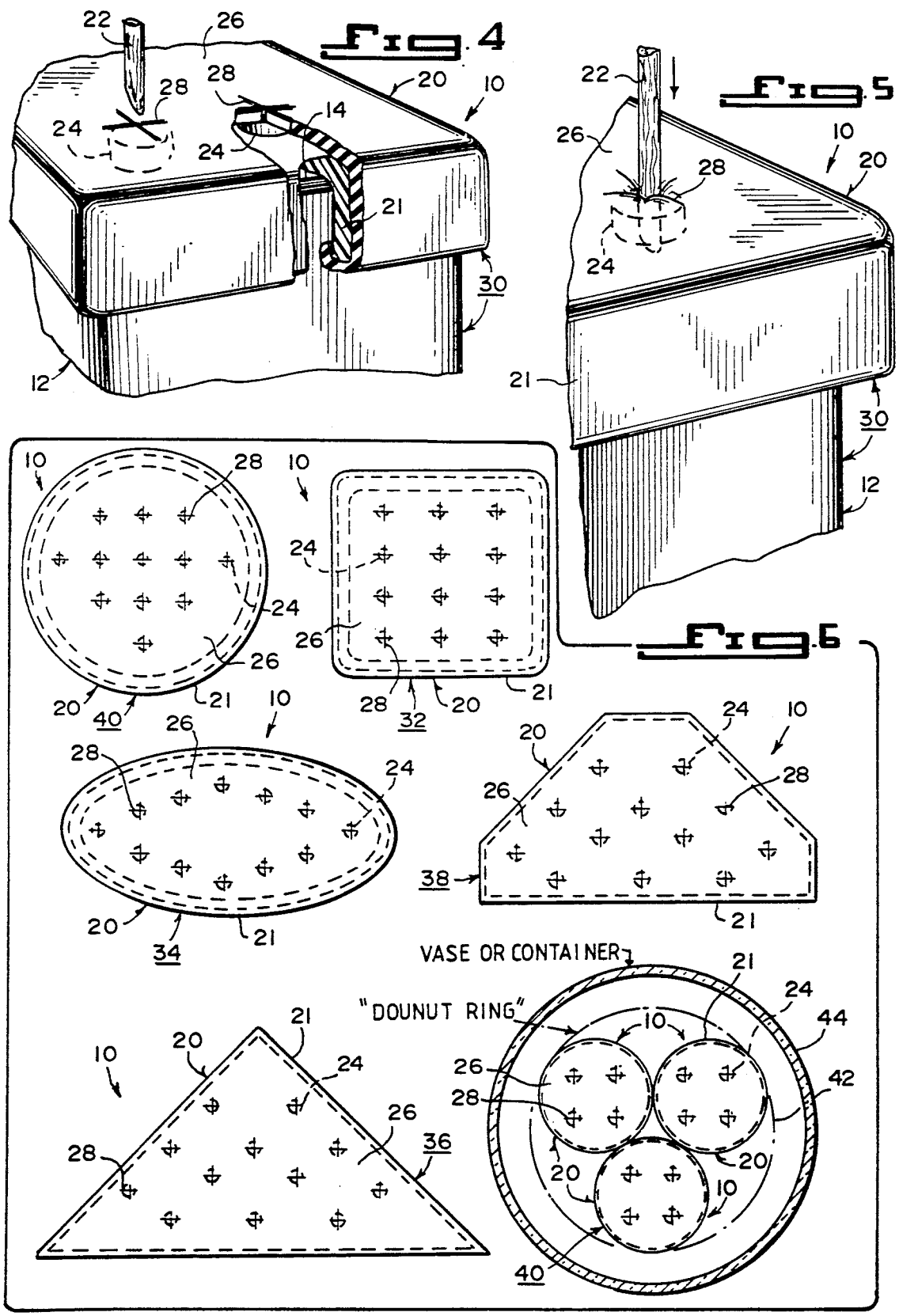

MULTIPLE FLOWER STEM HOLDER

BACKGROUND OF THE INVENTION

1. Field of the Invention

The instant invention relates generally to floral retainers and more specifically it relates to a multiple flower stem holder.

2. Description of the Prior Art

Numerous floral retainers have been provided in prior art that are adapted to prolong the life of cut flowers and display the same. While these units may be suitable for the particular purpose to which they address, they would not be as suitable for the purposes of the present invention as heretofore described.

SUMMARY OF THE INVENTION

A primary object of the present invention is to provide a multiple flower stem holder that will overcome the shortcomings of the prior art devices.

Another object is to provide a multiple flower stem holder that will consolidate groups of flowers into a single receptacle, retaining a large water supply which will last for a longer period of time thus reducing the chance that the stems will dry out.

An additional object is to provide a multiple flower stem holder being of a convenient shape that will fit into a standard bouquet box for an easier design solution to flower arranging.

A further object is to provide a multiple flower stem holder that is simple and easy to use.

A still further object is to provide a multiple flower stem holder that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention.

FIG. 2 is a front view taken in direction of arrow 2 with parts broken away and in section.

FIG. 3 is an enlarged cross sectional view as indicated by arrow 3 in FIG. 2.

FIG. 4 is an enlarged perspective view of the top portion of the invention with parts broken away through the cap showing the structure therein.

FIG. 5 is an enlarged perspective view of the top portion of the invention showing a flower stem being inserted through a self sealing opening in the cap.

FIG. 6 are top views showing various geometric configurations of the invention.

DETAILED DESCRIPTION OF THE PREFERRED EMBODIMENTS

Turning now descriptively to the drawings, in which similar reference characters denote similar elements throughout the several views, the Figures illustrate a multiple flower stem holder 10 consisting of a receptacle 12 having an open top 14 and a hollow interior 16 adapted for receiving water 18 therein. A closure cap 20 is provided having a skirt 21 to fit about the open top 14 of the receptacle 12, so that the closure cap 20 will cover the water 18 within the hollow interior 16 of the receptacle 12. A plurality of flower stems 22 can extend in a generally vertical position through a plurality of apertures 24, the closure cap 20 and into the water 18 in the hollow interior 16 of the receptacle 12. A pliable layer 26, such as rubber or the like, covers the closure cap 20. The pliable layer 26 has a plurality of crossed slots 28 which align with the plurality of apertures 24 in the closure cap 20. When the flower stems 22 are inserted into the crossed slots 28, through the apertures 24 and into the water 18 in the hollow interior 16 of the receptacle 12, the crossed slots 28 will automatically self seal about the flower stems 22.

The receptacle 12 and the closure cap 20 can be fabricated in various geometric configurations, such as rectangular shaped 30, as shown in FIGS. 1 through 5, square shaped 32, oval shaped 34, triangular shaped 36, truncated triangular shaped 38 and circular shaped 40, as all are shown in FIG. 6. A donut ring 42, illustrated in phantom lines in FIG. 6, will retain three circular shaped holders 40 together so that they can be placed into a cylindrically shaped vase container or the like 44. The receptacle 12 and the closure cap 20 can be made out of a durable plastic material, while other types of material (not shown) can be also utilized as long as they are waterproof.

LIST OF REFERENCE NUMBERS 10 multiple flower stem holder
12 receptacle
14 open top in 12
16 hollow interior in 12
18 water
20 closure cap
21 skirt on 20
22 flower stem
24 aperture in 20
26 pliable layer
28 crossed slot in 26
30 rectangular shaped holder
32 square shaped holder
34 oval shaped holder
36 triangular shaped holder
38 truncated triangular shaped holder
40 circular shaped holder
42 donut ring
44 cylindrically shaped vase, container or the like It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A multiple flower stem holder, comprising:
   a) a receptacle having an open top and a hollow interior adapted for receiving water therein;
   b) a flat closure cap having a skirt to fit about the open top of said receptacle, so that said flat closure cap will cover the water within the hollow interior of said receptacle;
   c) means in said flat closure cap, for allowing a plurality of flower stems to extend in a generally vertical position into the water in the hollow interior of said receptacle, said allowing means includes said flat closure cap having a plurality of apertures therethrough, each aperture being a sized to allow one flower stem to pass therethrough; and
   d) means in said closure cap, for sealing each of the flower stems that extend through said flat closure cap and into the water in the hollow interior of said receptacle, said sealing means includes a pliable layer juxtaposed to said flat closure cap, said pliable layer having a plurality of crossed slots which align with the plurality of apertures in said flat closure cap so that when the flower stems are inserted into the crossed slots and through the apertures in said flat closure cap the crossed slots will automatically self seal about the flower stems.

2. A multiple flower stem holder as recited in claim 1, wherein said receptacle and said closure cap are in a rectangular shaped configuration.

3. A multiple flower stem holder as recited in claim 1, wherein said receptacle and said closure cap are in a square shaped configuration.

4. A multiple flower stem holder as recited in claim 1, wherein said receptacle and said closure cap are in an oval shaped configuration.

5. A multiple flower stem holder as recited in claim 1, wherein said receptacle and said closure cap are in a triangular shaped configuration.

6. A multiple flower stem holder as recited in claim 1, wherein said receptacle and said closure cap are in a truncated triangular shaped configuration.

7. A multiple flower stem holder as recited in claim 1, wherein said receptacle and said closure cap are in a circular shaped configuration.

8. A multiple flower stem holder as recited in claim 7, further including a donut ring to retain three circular shaped holders together so that they can be placed into a cylindrically shaped vase, container or the like.

* * * * *